(12) United States Patent
Tsia et al.

(10) Patent No.: US 10,365,465 B2
(45) Date of Patent: Jul. 30, 2019

(54) APPARATUS AND METHOD FOR QUANTITATIVE PHASE-GRADIENT CHIRPED-WAVELENGTH-ENCODED OPTICAL IMAGING

(71) Applicant: VERSITECH LIMITED, Hong Kong (CN)

(72) Inventors: Kin Man Kevin Tsia, Hong Kong (CN); Tsz Wai Terence Wong, Kowloon (CN); Kam Seng Andy Lau, Kowloon (CN); Hin Long Tang, Hong Kong (CN)

(73) Assignee: Versitech Limited, Hong Kong (CN)

( * ) Notice: Subject to any disclaimer, the term of this patent is extended or adjusted under 35 U.S.C. 154(b) by 146 days.

(21) Appl. No.: 15/146,528

(22) Filed: May 4, 2016

(65) Prior Publication Data

US 2016/0327776 A1   Nov. 10, 2016

Related U.S. Application Data

(60) Provisional application No. 62/156,582, filed on May 4, 2015.

(51) Int. Cl.
*G06K 9/00* (2006.01)
*G02B 21/00* (2006.01)
(Continued)

(52) U.S. Cl.
CPC ..... *G02B 21/0056* (2013.01); *G02B 21/0064* (2013.01); *G02B 21/14* (2013.01); *G02B 21/367* (2013.01); *G02B 27/0087* (2013.01)

(58) Field of Classification Search
None
See application file for complete search history.

(56) References Cited

U.S. PATENT DOCUMENTS

| 5,444,527 A | 8/1995 | Kosaka |
| 5,521,699 A | 5/1996 | Kosaka et al. |

(Continued)

FOREIGN PATENT DOCUMENTS

| CN | 1243971 C | 3/2006 |
| CN | 101526464 B | 5/2011 |

(Continued)

OTHER PUBLICATIONS

Basiji, David A. et al., Cellular Image Analysis and Imaging by Flow Cytometry, Clinics in Laboratory Medicine, 2007, 27(3):653-670, Elsevier Inc.

(Continued)

*Primary Examiner* — Atiba O Fitzpatrick
(74) *Attorney, Agent, or Firm* — Saliwanchik, Lloyd & Eisenschenk

(57) ABSTRACT

Systems and method for high-speed single-pixel quantitative phase contrast optical imaging are provided. This imaging technique can bypass the use of conventional image sensors and their associated speed limitations. The quantitative phase images can be acquired much faster than conventional quantitative phase imaging by a chirped-wavelength-encoding mechanism via wavelength-swept laser sources or optical time-stretch based on optical fibers, without the need for interferometric approaches.

20 Claims, 12 Drawing Sheets

(51) Int. Cl.
G02B 21/14 (2006.01)
G02B 27/00 (2006.01)
G02B 21/36 (2006.01)

(56) References Cited

U.S. PATENT DOCUMENTS

| | | | |
|---|---|---|---|
| 6,204,944 | B1 | 3/2001 | Uchiyama et al. |
| 6,262,818 | B1 | 7/2001 | Cuche et al. |
| 7,796,256 | B2 | 9/2010 | Sieracki et al. |
| 7,925,069 | B2 | 4/2011 | Ortyn et al. |
| 8,039,776 | B2 | 10/2011 | Cui et al. |
| 8,184,298 | B2 | 5/2012 | Popescu et al. |
| 8,248,614 | B2 | 8/2012 | Mann et al. |
| 8,376,218 | B2 | 2/2013 | Jalali et al. |
| 8,548,219 | B2 | 10/2013 | Ortyn et al. |
| 8,693,000 | B2 | 4/2014 | Kim et al. |
| 2003/0210405 | A1* | 11/2003 | Feldman .......... G01N 21/95607 356/511 |
| 2006/0291712 | A1 | 12/2006 | Popescu et al. |
| 2008/0309944 | A1 | 12/2008 | Ferraro et al. |
| 2009/0135486 | A1* | 5/2009 | McNulty .............. G02B 21/14 359/565 |
| 2010/0085988 | A1 | 4/2010 | Fukuda |
| 2010/0141829 | A1 | 6/2010 | Jalali et al. |
| 2013/0135529 | A1 | 5/2013 | Jalali et al. |
| 2013/0229663 | A1 | 9/2013 | Yang et al. |
| 2013/0258090 | A1* | 10/2013 | Steinmeyer .......... G02B 21/361 348/79 |
| 2015/0087902 | A1* | 3/2015 | Mertz .................... G02B 21/14 600/109 |
| 2016/0320603 | A1* | 11/2016 | Stoppe ...................... G06T 5/50 |
| 2017/0276923 | A1* | 9/2017 | Stoppe .................. G02B 21/06 |

FOREIGN PATENT DOCUMENTS

| | | |
|---|---|---|
| EP | 0543514 A2 | 5/1993 |
| WO | WO-2013/086527 A1 | 6/2013 |

OTHER PUBLICATIONS

Gorthi, Sai Siva et al., Phase imaging flow cytometry using a focus-stack collecting microscope, Optics Letters, Feb. 15, 2012, 37(4):707-709, Optical Society of America.
George, Thaddeus C. et al., Distinguishing Modes of Cell Death Using the ImageStream® Multispectral Imaging Flow Cytometer, Cytometry Part A, 2004, 59A(2):237-245, Wiley-Liss, Inc.
Mahjoubfar, Ata et al., Label-free high-throughput cell screening in flow, Biomedical Optics Express, Sep. 1, 2013, 4(9):1618-1625, Optical Society of America.
Schonbrun, Ethan et al., Quantitative Absorption Cytometry for Measuring Red Blood Cell Hemoglobin Mass and Volume, Cytometry Part A, 2014, 85A(4):332-338, International Society for Advancement of Cytometry.
Popescu, Gabriel et al., Optical Measurement of Cell Membrane Tension, Physical Review Letters, Nov. 24, 2006, 97(21):218101-1 to 218101-4, The American Physical Society.
Popescu, Gabriel et al., Observation of dynamic subdomains in red blood cells, Journal of Biomedical Optics Letters, Jul./Aug. 2006, 11(4):040503-1 to 040503-3, Society of Photo-Optical Instrumentation Engineers (SPIE).
Choi, Wonshik et al., Tomographic phase microscopy, Nature Methods, Sep. 2007, 4(9):717-719, Nature Publishing Group.
Yu, Lingfeng et al., Quantitative phase evaluation of dynamic changes on cell membrane during laser microsurgery, Journal of Biomedical Optics Letters, Sep./Oct. 2008, 13(5):050508-1 to 050508-3, Society of Photo-Optical Instrumentation Engineers (SPIE).
Akkin, Taner et al., Spectral-domain optical coherence phase microscopy for quantitative phase-contrast imaging, Optics Letters, Aug. 15, 2005, 30(16):2131-2133, Optical Society of America.
Yamauchi, Toyohiko et al., Low-coherent quantitative phase microscope for nanometer-scale measurement of living cells morphology, Optics Express, Aug. 4, 2008, 16(16):12227-12238, Optical Society of America.

Wang, Pin et al., Spatial-domain Low-coherence Quantitative Phase Microscopy for Cancer Diagnosis, Proc. of SPIE, 2011, 7889:78891Q-1 to 78891Q-6, Society of Photo-Optical Instrumentation Engineers (SPIE).
Ikeda, Takahiro et al., Hilbert phase microscopy for investigating fast dynamics in transparent systems, Optics Letters, May 15, 2005, 30(10):1165-1167, Optical Society of America.
Park, Yongkeun et al., Spectroscopic phase microscopy for quantifying hemoglobin concentration in intact red blood cells, Optics Letters, Dec. 1, 2009, 34(23):3668-3670, Optical Society of America.
Cuche, Etienne et al., Digital holography for quantitative phase-contrast imaging, Optics Letters, Mar. 1, 1999, 24(5):291-293, Optical Society of America.
Charrière, Florian et al., Cell refractive index tomography by digital holographic microscopy, Optics Letters, Jan. 15, 2006, 31(2):178-180, Optical Society of America.
Shaked, Natan T. et al., Whole-cell-analysis of live cardiomyocytes using wide-field interferometric phase microscopy, Biomedical Optics Express, Sep. 1, 2010, 1(2):706-719, Optical Society of America.
Girshovitz, Pinhas et al., Generalized cell morphological parameters based on interferometric phase microscopy and their application to cell life cycle characterization, Biomedical Optics Express, Aug. 1, 2012, 3(8):1757-1773, Optical Society of America.
Marquet, P. et al., Exploring Neural Cell Dynamics with Digital Holographic Microscopy, Annual Review of Biomedical Engineering, 2013, 15:407-431, Annual Reviews.
Goda, Keisuke et al., Amplified dispersive Fourier-transform imaging for ultrafast displacement sensing and barcode reading, Applied Physics Letters, 2008, 93:131109-1 to 131109-3, American Institute of Physics.
Goda, K. et al., Serial time-encoded amplified imaging for real-time observation of fast dynamic phenomena, Nature, Apr. 30, 2009, 458(7242):1145-1149, Macmillan Publishers Limited.
Tsia, Kevin K et al., Performance of serial time-encoded amplified microscope, Optics Express, May 10, 2010,18(10):10016-10028, Optical Society of America.
Jalali, Bahram et al., Time-stretch imaging and its applications to high-throughput microscopy and microsurgery, IEEE Photonics Society Newsletter, 2010, 24(2):1-42.
Zhang, Chi et al., Serial time-encoded amplified microscopy (STEAM) based on a stabilized picosecond supercontinuum source, Optics Express, Aug. 15, 2011, 19(17):15810-15816, Optical Society of America.
Qiu, Yi et al., Exploiting few mode-fibers for optical time-stretch confocal microscopy in the short near-infrared window, Optics Express, Oct. 22, 2012, 20(22):24115-24123, Optical Society of America.
Wong, Terence T.W. et al., Optical time-stretch confocal microscopy at 1μm, Optics Letters, Aug. 15, 2012, 37(16):3330-3332, Optical Society of America.
Goda, Keisuke et al., High-throughput single-microparticle imaging flow analyzer, Proceedings of the National Academy of Sciences of the United States of America, Jul. 17, 2012, 109(29):11630-11635, PNAS.
Wong, Terence T.W. et al., Asymmetric-detection time-stretch optical microscopy (ATOM) for ultrafast high-contrast cellular imaging in flow, Scientific Reports, Jan. 13, 2014, 4(3656):1-9.
International Search Report and Written Opinion dated Aug. 3, 2016 in International Application No. PCT/CN2016/080953.
Goldstein, R.M. et al., "Satellite radar interferometry: Two-dimensional phase unwrapping", Radio Science, Aug. 1988, 23(4):713-720, American Geophysical Union.
Tsia, K.K. et al., "Simultaneous mechanical-scan-free confocal microscopy and laser microscopy", Optics Letters, Jul. 15, 2009, 34(14):2099-2101, Optical Society of America.
Tearney, G.J. et al. "Spectrally encoded miniature endoscopy", Optics Letters, Mar. 15, 2002, 27(6):412-414, Optical Society of America.
Pitris, C. et al. "A GRISM-based probe for spectrally encoded confocal microscopy", Optics Express, Jan. 27, 2003, 11(2):120-124, OSA.

(56) References Cited

OTHER PUBLICATIONS

Yun, S.H. et al., "Rapid wavelength-swept spectrally encoded confocal microscopy", Optics Express, Oct. 3, 2005, 13(20):8214-8221, OSA.
Yaqoob, Z. et al., "Passive Optics No-Moving-Parts Barcode Scanners", IEEE Photonics Technology Letters, Mar. 2004, 16(3):954-956, IEEE.
Wong, T.T.W. et al., "Ultrafast flow imaging by 1 μm time-stretch microscopy", Optics in the Life Sciences Congress Technical Digest, 2013 the Optical Society (OSA), 1 page.
Lau, A.K.S. et al., "Interferometric time-stretch microscopy for ultrafast quantitative cellular imaging at 1 μm", Optics in the Life Sciences Congress Technical Digest, 2013 the Optical Society (OSA), 1 page.
Lau, A.K.S. et al., "Ultrafast high-contrast microfluidic cellular imaging by asymmetric-detection time-stretch optical microscopy (ATOM)", Frontiers in Optics Postdeadline, OSA 2013, 2 pages.
Kachar, B., "Asymmetric Illumination Contrast: A Method of Image Formation for Video Light Microscopy", Feb. 15, 1985, Science, 227(4688):766-768.
Iglesias, I., "Pyramid phase microscopy", Optics Letters, Sep. 15, 2011, 36(18):3636-3638, Optical Society of America.
Parthasarathy, A.B. et al., "Quantitative phase imaging using a partitioned detection aperture", Optics Letters, Oct. 1, 2012, 37(19):4062-4064, Optical Society of America.
Mehta, S.B. et al., "Quantitative phase-gradient imaging at high resolution with asymmetric illumination-based differential phase contrast", Optics Letters, Jul. 1, 2009, 34(13):1924-1926, Optical Society of America.
Arnison, M.R. et al., "Linear phase imaging using differential interference contrast microscopy", Journal of Microscopy, Mar. 23, 2004, vol. 214, Issue 1, 31 pages, John Wiley & Sons, Inc.
Perfetto, S.P. et al., "Seventeen-colour flow cytometry: unravelling the immune system", Nature Reviews Immunology, Aug. 2004, 4:648-655.
Baker, M., "Faster frames, clearer pictures", Nature Methods, 2011, 8:1005-1009.

\* cited by examiner

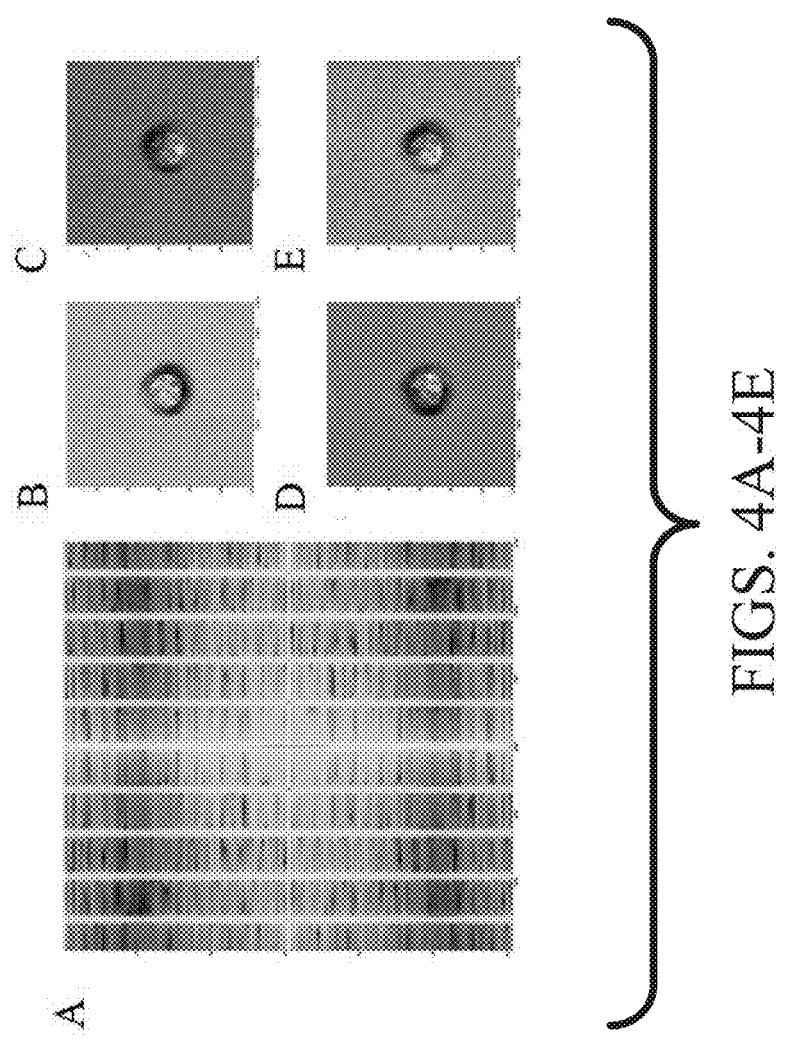

APPARATUS AND METHOD FOR QUANTITATIVE PHASE-GRADIENT CHIRPED-WAVELENGTH-ENCODED OPTICAL IMAGING

BACKGROUND OF THE INVENTION

Optical microscopy is an effective tool to visualize miniature objects with high spatiotemporal resolution and in a nearly noninvasive manner. Its utility has been widespread in numerous applications including industrial, life science, and biomedical research. For instance, state-of-the-art biological cellular assay techniques involved in life science research and clinical diagnosis have adopted optical microscopy as a method of classifying different cell types and/or disease stages in order to determine their respective cellular functions.

The functional and structural information of biological cells can commonly be inferred by their correlated image contrasts. While exogenous fluorescent labels are the prevalent contrast agents used in many cell biology applications, they are not always ideal in view of the complications of introduced cytotoxicity and photobleaching as well as laborious specimen preparations. In contrast, endogenous image contrast (e.g., absorption, scattering) could serve as an effective intrinsic biomarker in certain applications without the need for a label or a stain and the associated laborious sample preparation procedures. Among different label-free optical imaging modalities, quantitative phase-contrast imaging (QPI) possesses an unique attribute of providing not only non-invasive high image contrast, but also quantitative evaluation of cellular information at nanometer scale based on the mapping of optical phase shift across transparent cells or tissues.

Information derived from QPI can then be used as intrinsic biomarkers for cellular identification and understanding of the corresponding physiological information such as the diseased state of cells and tissues. Intrinsic parameters including optical (e.g., light scattering, refractive index), physical (e.g., size, morphology) and mechanical (e.g., mass density, stiffness, deformability) properties of the biological specimens have now been recognized as the new dimensions of phenotypic information valuable for bioassays as complementary parameters to other well understood molecular-specific information. Notably, refractive index of cell nuclei can serve as a distinct indicator for label-free detection of cancer cells with high sensitivity.

However, such high-information-content measurements of innumerable cells or large-area tissues generally demand high-throughput imaging capability, which directly links to the image acquisition rate of QPI. Similar to other classical optical imaging systems, the fact that QPI mostly requires CCD/CMOS sensors for image acquisition leads to the common trade-off between imaging sensitivity and speed. Intrinsic parameters aforementioned have long been left uncharted, particularly in the context of high-throughput single-cell analysis—a popular tool today for unraveling the complex cellular physiology and thus understanding the pathogenesis of diseases by studying different types and stages of cells in their lineages down to single-cell precision. This is challenging because cellular properties, influenced by genetic diversity and/or epigenetic variations, are now known to be highly heterogeneous, even within the same cell population.

In order to evaluate cell-to-cell differences, or to detect the rare cells, the characteristics of individual cells should be cataloged. Higher-confidence characterization typically comes with a progressively larger number of parameters that can be extracted from each single-cell measurement. This drives the blooming interest in developing new approaches for realizing high-throughput and accurate single-cell analysis, which can have a profound impact on advancing drug discovery, aberrant stem cell screening, and rare cancer cell detection, among many other applications. Incorporating quantitative single-cell imaging is thus of great value in advancing single-cell analysis. In the related art, though, higher content typically comes at the expense of lower throughput, and vice versa. This is exemplified by the emerging interest in adding imaging capability to flow cytometry. By accessing the additional spatial information of the cells, these imaging flow cytometers only achieve an imaging throughput (about 1,000 cells/sec) that is orders of magnitude slower than that of non-imaging flow cytometers.

Built upon the classical phase-contrast and differential interference contrast (DIC) microscopy, many related art QPI techniques are mostly based on either interferometric or holographic approaches, which require sophisticated setups and can be vulnerable to mechanical disturbance. Even though QPI can be performed without exogenous labels, related art QPI techniques are not fully compatible with high-throughput image-based cellular assays because of their speed limitation. In addition, the image acquisition rate can be largely impeded by the fundamental speed-sensitivity trade-off in CCD/CMOS image sensors, and phase-retrieval in these techniques can often be computationally intensive, thereby hindering efficient high-speed real-time quantitative cellular image analysis.

As a high-speed imaging technology, time-stretch imaging is particularly suitable for high-throughput single-cell imaging and analysis due to its ultrafast imaging speed (orders-of-magnitude faster than classical image sensors) operated in real-time continuously. However, time-stretch imaging has been primarily compatible with bright-field imaging mode, which is not suitable to deliver high-contrast image quality as well as high-content quantitative image analysis of label-free/unstained biological cells and tissues. QPI has been combined with time-stretch imaging based on interferometry—implying again that the implementation is susceptible to mechanical disturbance and is not suitable for long-term operation.

BRIEF SUMMARY OF THE INVENTION

Embodiments of the subject invention provide advantageous systems and methods for high-speed single-pixel quantitative phase contrast optical imaging (QPI). The systems and methods can utilize an imaging technique that bypasses the use of conventional image sensors and their associated speed limitations. Quantitative phase images can be acquired in high-speed (e.g., orders of magnitude faster than conventional quantitative phase imaging) by a chirped-wavelength-encoding mechanism. Such a mechanism can be implemented with wavelength-swept laser sources and/or optical time-stretch without the need for classical interferometric approaches.

Compared to related art bright-field counterparts (e.g., spectral-encoded imaging and time-stretch imaging), the systems and methods of the subject invention not only offer high-speed optical imaging with higher contrast, but also provide quantitative information about the imaged objects (e.g., biological cells and tissues) with an unprecedented combination of information content and throughput.

In many embodiments of the subject invention, QPI can be implemented without the use of interferometry. This can significantly reduce or even eliminate the need for iterative phase retrieval algorithms, as in interferometry-based quantitative phase imaging, and therefore reduce the computational complexity. In contrast to interferometry, certain embodiments do not require a dedicated optical setup for maintaining long-term mechanical stability. The quantitative phase image information can be chirped-wavelength-encoded and thus can be manipulated within a single optical beam propagating in free-space or wave-guiding media, e.g., optical fibers. This provides higher flexibility in system design.

According to many embodiments of the subject invention, phase contrast information can be flexibly manipulated by a time-division multiplexing (TDM), frequency-division multiplexing (FDM), and/or code-division multiplexing (CDM) scheme, which can enable high-speed image acquisition. This feature is uniquely leveraged by the optical fiber implementation, which is absent in any existing phase contrast imaging systems. In contrast to the standard active multiplexing schemes adopted in fiber-optic communication, embodiments of the subject invention can utilize a completely different approach to implement passive multiplexing schemes that enable ultrafast multiplexing of multiple phase-contrast images virtually in any wavelength range (not limited to telecommunication band only). Systems and methods of the subject invention can also be used for many other applications, including but not limited to quantitative imaging for micro-endoscopy used in clinical applications and high-volume manufacturing inspection in industrial applications for high-throughput quality control, such as very-large scale integration (VLSI) semiconductor devices.

High-throughput, image-based, single-cell analysis can be provided, based on quantitative phase-contrast, in many embodiments of the subject invention. Quantitative phase is promising as a sensitive biomarker for cellular analysis, but has not previously been applied in the field in flow cytometry (due at least in part to the absence of available high-speed quantitative phase imaging technology compatible with current flow cytometers). Many embodiments of the subject invention provide an enabling platform for a new realm of single-cell analysis.

Compared to conventional non-imaging and imaging flow cytometers, at least one embodiment of the subject invention can provide high throughput (for example, at a throughput of at least 100,000 cells/second), high-content label-free quantitative imaging (and thus analysis) of single-cell information (e.g., cell volume, mass, refractive index, stiffness, membrane tension) for basic life science research as well as clinical diagnosis (e.g., rare cancer cell detection). Note again that existing imaging flow cytometers are incapable of delivering quantitative phase imaging, and their imaging speed is orders of magnitude slower than that of systems and methods of the subject invention.

BRIEF DESCRIPTION OF THE DRAWINGS

The invention will be more fully understood by reference to the following drawings, which are for illustrative purposes only.

FIG. 3B shows a schematic of a passive modulator.

FIG. 4A shows a Fourier transformation of four frequency-modulated images.

FIG. 4B shows an image reconstructed after band-pass filtering.

FIG. 4C shows an image reconstructed after band-pass filtering.

FIG. 4D shows an image reconstructed after band-pass filtering.

FIG. 4E shows an image reconstructed after band-pass filtering.

FIG. 11A shows images of four image contrasts of ten PBMC.

FIG. 11B shows images of four image contrasts of ten THP-1.

DETAILED DESCRIPTION OF THE INVENTION

The subject invention relates to systems and methods for high-speed single-pixel quantitative phase contrast optical imaging. More specifically, the subject invention is embodied in the apparatus, methods, and results as shown in the figures and examples provided herein for illustrative purposes. It will be appreciated that the apparatus may vary as to configuration and as to details of the parts, and that the method may vary as to the specific steps and sequence, without departing from the basic concepts as disclosed herein.

Figure 1A:
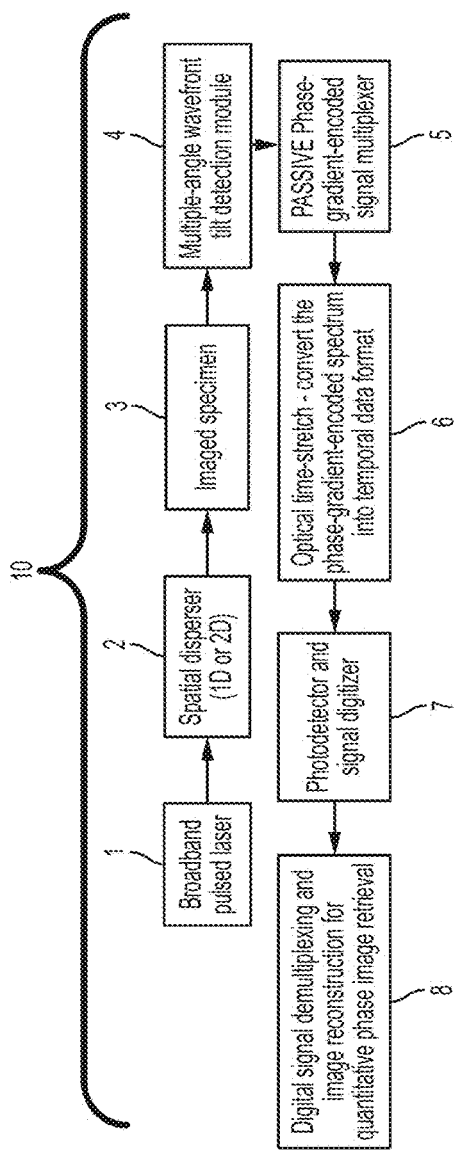
FIG. 1A shows a schematic view of a device of the subject invention.
Figure 1B:
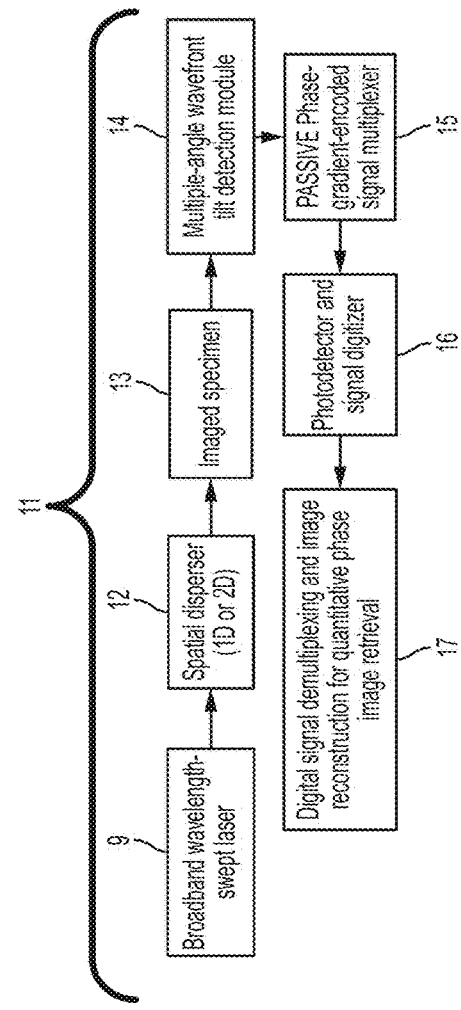
FIG. 1B shows a schematic view of a device of the subject invention.

FIGS. 1A and 1B show schematic views of quantitative phase imaging according to embodiments of the subject invention. Referring to FIG. 1A, an implementation 10 based on optical time-stretch is illustrated. Referring to FIG. 1B, an implementation 11 based on the use of a broadband wavelength-swept laser is illustrated.

In an embodiment 10, a light source 1 can be a laser source, such as a pulsed laser or a wavelength-swept source. The light can first be spatially dispersed in one-dimension (1D) or two-dimensions (2D) by diffractive optical elements (or a 1D or 2D spatial disperser 2) to form a 1D or 2D spectral shower, which can be illuminated onto the sample 3 to be imaged (e.g., a specimen such as biological cells and/or tissues). Referring to the spatial disperser 2, it can be implemented by diffraction grating, or prism for 1D spatial disperser whereas a combination of diffraction and virtually-imaged phase array (VIPA) for 2D spatial disperser, though embodiments are not limited thereto. This spectral shower encodes the specimen information at different spatial coordinates in the optical spectrum. This can be referred to as a space-to-wavelength mapping (spectral encoding). The spectrally-encoded optical beam passes through a multiple-angle wavefront detection module 4 in which the beam is first split into N separate channels (e.g., N=4), and each of them is encoded with N different gradient phase-contrasts. These N different gradient-phase-contrast channels are then multiplexed by a passive phase-gradient-encoding signal multiplexer 5 and are further encoded (or converted) into the temporal waveform after the optical time-stretch process 6. Optical time-stretch is a process in which the image information encoded in the broadband optical pulse is converted into a serial temporal data format in real time via group velocity dispersion (GVD) in the dispersive optical fiber. Essentially, the phase-gradient contrast image data can be temporally encoded in the chirped-wavelength spectrum after the time-stretch process. The encoded signal can be serially detected by a single-pixel photo-detector and digitizer 7. The final step is to demultiplex the signal and retrieve the quantitative phase image by subsequent digital image reconstruction 8.

FIG. 1B shows an example embodiment 11 of the subject invention. The light source 9 can be a wavelength-swept source. The wavelength-swept mechanism can be based on mechanical means (e.g. Fourier-domain mode-locked laser) and non-mechanical ones (e.g. all-optical wavelength-swept by optical time-stretch). Similar to FIG. 1A, the wavelength-swept light beam can first be spatially dispersed by diffractive optical elements 12 (or a spatial disperser) to form a spectral shower, which can be illuminated onto the sample 13 to be imaged. The spectrally-encoded optical beam passes through a multiple-angle wavefront detection module 14, followed by a passive phase-gradient-encoding signal multiplexer 15. Note that the phase-gradient contrast image data is temporally encoded in the chirped-wavelength spectrum (or equivalently the temporal waveform), which can be detected in time by a single-pixel photo-detector and digitizer 16. The resultant quantitative phase image is retrieved by subsequent signal demultiplexing and digital image reconstruction 17. It should be noted that the image acquisition line-scan rate or frame rate can be any suitable value, such as a value in a range of 100 kHz to 100 MHz, enabled by the high-speed chirped-wavelength mechanism.

Referring to the multiple-angle wavefront detection module 4 or 14, spectrally encoding the gradient phase contrast information can be implemented by a small angular misalignment in fiber coupling, or by partial beam-block using a knife-edge before fiber coupling, though embodiments are not limited thereto. As the information at all the spatial coordinates is spectrally encoded and collapsed to a single beam after the spectral-encoding imaging step, such asymmetric detection scheme resembles the concept of Schlieren imaging. This is a technique in which in the detection path of the imaging system is partially-blocked (near a Fourier plane of the specimen) to generate an enhanced image contrast showing a differential interference contrast (DIC) like shadow effects. Mathematically, it is equivalent to generate different phase-gradient image contrasts by a Hilbert transformation according to the wavefront tilt direction (i.e. the fiber coupling direction or the partial beam-block direction).

Figures 2A, 2B, 2C, 2D:
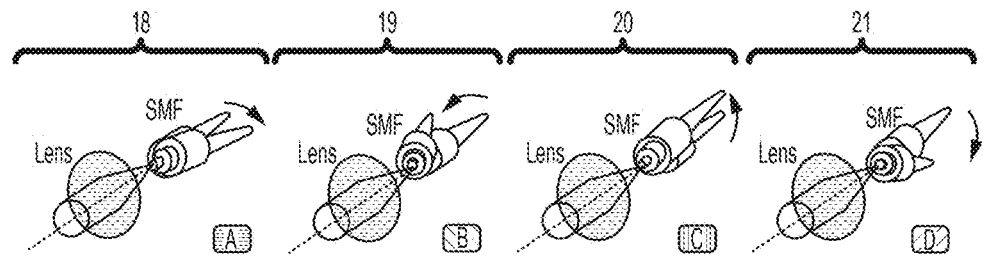
FIG. 2A shows a schematic of an asymmetric-detection orientation adopted in an embodiment of the subject invention.
FIG. 2B shows a schematic of an asymmetric-detection orientation adopted in an embodiment of the subject invention.
FIG. 2C shows a schematic of an asymmetric-detection orientation adopted in an embodiment of the subject invention.
FIG. 2D shows a schematic of an asymmetric-detection orientation adopted in an embodiment of the subject invention.

FIGS. 2A-2D show an example of the schematic views of four asymmetric detection orientations (N=4) that can be adopted according to an embodiment of the subject invention. The spectrally-encoded optical beam can first be split into N separate channels (e.g., N=4), and each of them can then be respectively coupled into an optical fiber (e.g. single-mode fiber (SMF)) from different off-axis orientations through the relay lenses. FIGS. 2A and 2B show the off-axis coupling of the imaged-encoded (spectrally-encoded) beams A and B from two opposite orientations 18 and 19, respectively, with respect to the fiber axis along in the horizontal plane whereas FIGS. 2C and 2D show the off-axis coupling of the imaged-encoded (spectrally-encoded) beams C and D from two opposite orientations 20 and 21, respectively, with respect to the fiber axis along in the vertical plane. The different off-axis orientations of fiber coupling can give rise to different gradient phase-contrasts. Such gradient phase-contrast not only shows higher image contrast than ordinary spectrally encoded imaging or time-stretch imaging, it can also be exploited for quantitative phase retrieval.

After the off-axis fiber coupling, each collected gradient phase contrast can thus be encoded into the chirped-wavelength optical spectrum of the light source (e.g., swept-source or pulse laser after the optical time-stretch process). Essentially, the image data can be temporally encoded in the chirped-wavelength spectrum after the time-stretch process. In both the embodiments 10 and 11, the encoded signal can be serially detected by a single-pixel photo-detector and can be digitized for subsequent digital image reconstruction.

In contrast to conventional phase gradient contrast imaging techniques, systems and methods of the subject invention can result in the gradient phase contrasts being acquired by the use of optical fibers, which offer a high degree of flexibility in hardware system design. The gradient phase contrast can be acquired at high-speed (e.g., imaging rate of as high as 100 kHz to 100 MHz) enabled by the chirped-wavelength encoding, which can also readily be implemented in the optical fiber format. Before photodetection, in-line optical image amplification can also be implemented to compensate the off-axis fiber coupling loss and intrinsic fiber loss. Optical image amplification is absent in image sensor technologies used in the related art.

Figure 3A:
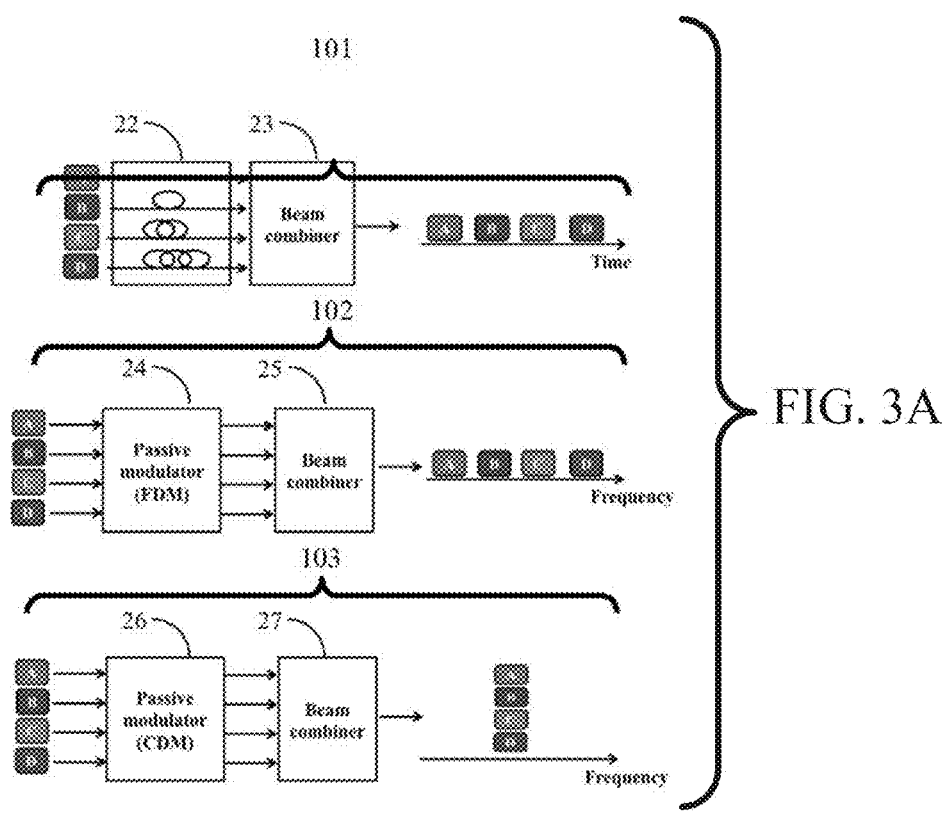
FIG. 3A shows schematics of three different schemes of multiplexing four gradient phase-contrast images.
Figures 5A, 5B, 5C, 5D:
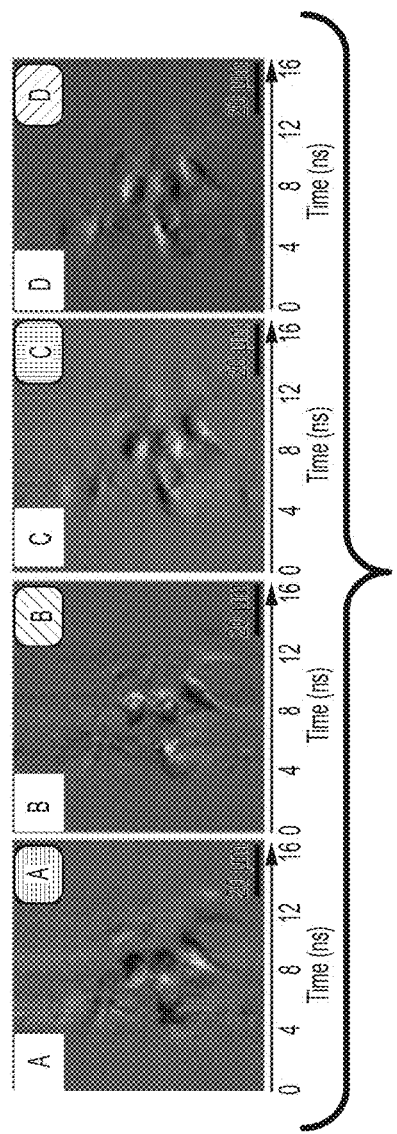
FIG. 5A shows an image of nasopharyngeal epithelial cells.
FIG. 5B shows an image of nasopharyngeal epithelial cells.
FIG. 5C shows an image of nasopharyngeal epithelial cells.
FIG. 5D shows an image of nasopharyngeal epithelial cells.

Referring to the blocks of passive phase-gradient-encoded signal multiplexer 5 and 15 shown in FIGS. 1A and 1B, FIG. 3A shows three different implementations of multiplexing N (e.g., N=4) gradient-phase-contrast images. The top scheme 101 in FIG. 3A illustrates time division multiplexing (TDM); the middle scheme 102 in FIG. 3A illustrates frequency division multiplexing (FDM); and the bottom scheme 103 in FIG. 3A illustrates code division multiplexing (CDM).

The gradient phase contrast encoding approach described herein also enables a variety of signal multiplexing schemes for optimal image acquisition in terms of speed and signal integrity. Signal multiplexing can be implemented by any device capable of performing schemes including, but not limited to, TDM, FDM, and CDM—a well-known concept adopted in telecommunication, but that is largely unexplored in the realm of biological imaging because of the lack of an image-encoding scheme. Complementary de-multiplexing device are employed in accordance with the choice of multiplexer.

Referring to the scheme 101, TDM of the gradient phase contrast image signals (labeled A, B, C, and D) can be implemented by introducing different time delays in the individual fibers 22 in such a way that there is no temporal overlap among these signals. Then, these spectrally-encoded (time-delayed) gradient contrast signals can then all be coupled into the same fiber by the beam combiner 23 followed by optical time-stretch (in embodiment 10) or photodetection directly (in embodiment 11).

Referring to the scheme 102, FDM of the gradient phase contrast image signals can be implemented by passive amplitude modulation 24 at different frequencies across the spectra of the different signals. Note that signals can be temporally overlapped. Then, these frequency-multiplexed, spectrally-encoded, gradient phase contrast signals can then all be coupled into the same fiber by the beam combiner 25 followed by optical time-stretch (in embodiment 10) or photodetection directly (in embodiment 11).

Referring to the scheme 103, CDM of the gradient phase contrast image signals can be implemented by passive amplitude modulation 26 at different patterns (codes) across the spectra of the different signals. Note that signals can overlap in both frequency and time. Then, these coded-multiplexed spectrally-encoded gradient contrast signals can then all be coupled into the same fiber by the beam combiner 27 followed by optical time-stretch (in embodiment 10) or photodetection directly (in embodiment 11). Note that the beam combiners 23, 25, and 27 can be implemented in optical fiber format (e.g., N-to-1 fiber coupler) or in free-space (e.g., by multiple beam splitters), though embodiments are not limited thereto.

Referring to the passive modulators 24 and 26, the multiplexing can simply be done in a passive mode, without the use of active phase or amplitude modulators. FIG. 3B shows an example implementation of a passive amplitude modulator. Referring to FIGS. 3A and 3B, the N (e.g., N=4) spatially separated beams 28 (labeled A, B, C, and D), each of which has already been encoded with different gradient phase-contrast spatial information of a sample, can be spatially dispersed by a spatial disperser 29. The spatial disperser can be, for example, off-the-shelf diffraction grating or VIPA, though embodiments are not limited thereto. These N beams are spatially dispersed by the spatial disperser 29 and form N spectral shower beams 30 are illuminated onto the static mask 31. The printed/pre-fabricated pattern on the mask in effect performs spectral amplitude modulation on the spatially-dispersed beams as they transmit through the mask or are reflected from the mask. These beams are then multiplexed by the beam combiners 25 (for the FDM scheme 102) and 27 (for the CDM scheme 103). The mask can be designed in a way that four different mask patterns, and thus the N different spectral amplitude modulations, are imposed onto the four beams, respectively. This approach can be applied to both FDM scheme 102 and CDM scheme 103. For FDM, the patterns on the mask can essentially be a sinusoidal pattern with pre-defined spatial frequencies. Different beams thus experience different modulation frequencies because of the wavelength-to-time mapping. For CDM, the patterns can be any arbitrary ones as long as the coded patterns are spatially orthogonal to each other, which is an important prerequisite for de-multiplexing the codes. Again, these coded patterns can be easily printed on the static mask. Because of the chirped-wavelength nature of the source (e.g., by time-stretch technique or by using a swept-source), spectral modulation can be transformed into temporal modulation at an ultrafast rate (e.g., >>10 GHz), and all can be performed passively without the need for or use of active electro-optic modulators.

One of the unique and advantageous features of the modulation approach of certain embodiments is its passive operation, without the use of active phase or amplitude modulators that are common in telecommunication applications. Upon modulation, the N modulated beams can then be combined. If the light source is a swept source laser, a photo-detector can be used to detect the temporal waveform (i.e., a superposition of four spectra). To retrieve the four images, a de-multiplexing scheme is required. In the case of FDM, because the four beams are encoded with different modulation frequencies, performing a Fourier transformation on the acquired multiplexed signal yields four different modulation frequency side-bands. Four images with diffraction-limited resolution can be retrieved through taking the inverse Fourier transformation on the selected four individual frequency bands, similar to the standard de-multiplexing scheme. This is illustrated in the experimental results (after digital signal processing) in FIGS. 4A-4E. FIGS. 4A-4E show images illustrating an example of FDM of the multiplexed gradient phase-contrast encoded images. FIG. 4A shows a Fourier transformation of the sum of four frequency modulated images (i.e., multiplexed images using the FDM scheme), and FIGS. 4B-4E show how after digital band-pass filtering, individual single-angled images can be reconstructed. It should be noted that, though four modulated beams are described, this is for exemplary purposes only and should not be construed as limiting. This concept can be extended to any suitable number of beams (e.g., two, three, five, six, seven, etc.).

Passive modulation operation according to the subject invention shows many advantages. First, common problems in active modulators (particularly electro-optic ones) used in telecommunications include timing jitter, electronic noise, and thermal affect; these can be eliminated in the passive approach. The signal distortion due to the modulator is minimal and signal integrity is thus preserved. Second, active modulators typically only provide up to about 10 decibels (dB) extinction ratio, particularly in the high modulation frequency regime (i.e., >10 GHz in some applicable cases). In contrast, in the passive modulation mode, a high extinction ratio (>>40 dB) can be readily achieved, entirely governed by reflective/transmissive coating materials that are routinely adopted in thin-film coating fabrication foundry. Third, due to the passive operation, no synchronization is required for different instruments in the whole system (e.g., modulators and laser sources), greatly simplifying the implementation. Fourth, the passive modulation concept is applicable readily outside the telecommunication band, particularly to shorter near infrared (NIR) and even visible range. There is no related art modulation technology (>>GHz) available in this wavelength regime. This technique uniquely enables ultrafast gradient phase contrast imaging in an unprecedentedly wide wavelength span. Fifth, the modulation temporal resolution is only fundamentally governed by the spectral resolution of the spatial disperser (e.g., diffraction grating), which can again be flexibly customized. This greatly simplifies the design of the apparatus.

In many embodiments, the modulation bandwidth can be in the regime of >10 GHz, which is not readily achievable in the related art in a biophotonics-favorable spectral window (e.g., visible to NIR—about 400 nm to about 1000 nm). This is the spectral range particularly favorable for high-resolution gradient phase contrast imaging presented in this invention. Passive modulation represents a practical approach to realize this ultrafast imaging capability. The systems and methods of the subject invention can be applied to any suitable swept sources (e.g., those with a repetition rate of about 1 MHz).

Figure 7A:
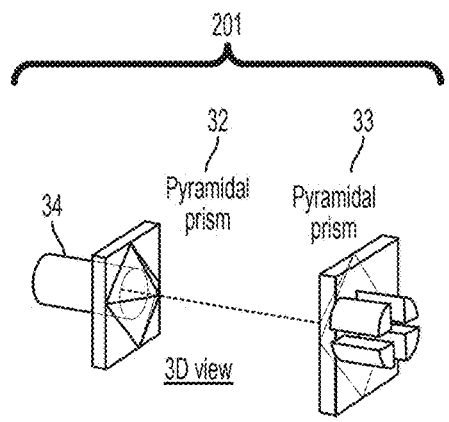
FIG. 7A shows a perspective view of a pyramidal prism implementation.
Figure 7B:
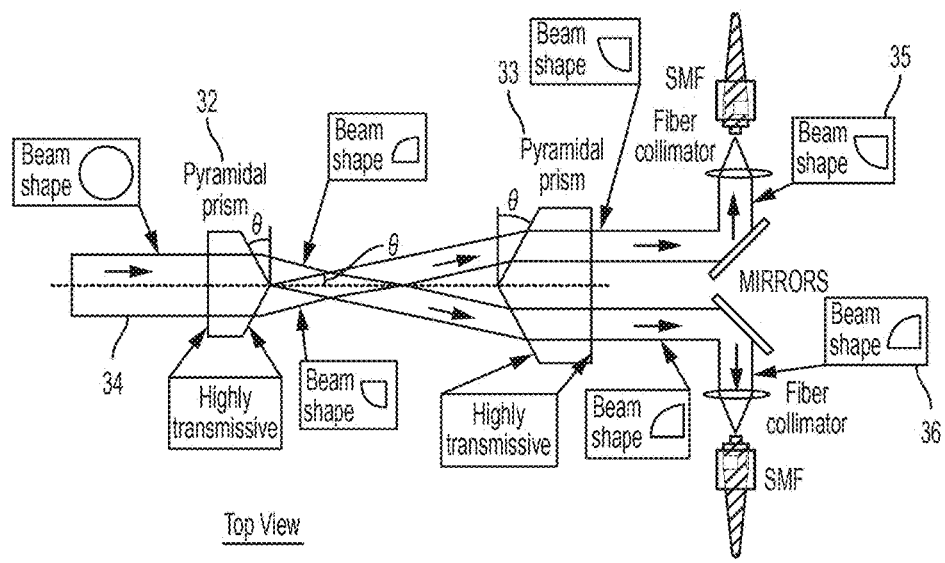
FIG. 7B shows a top view of a pyramidal prism implementation.
Figure 7C:
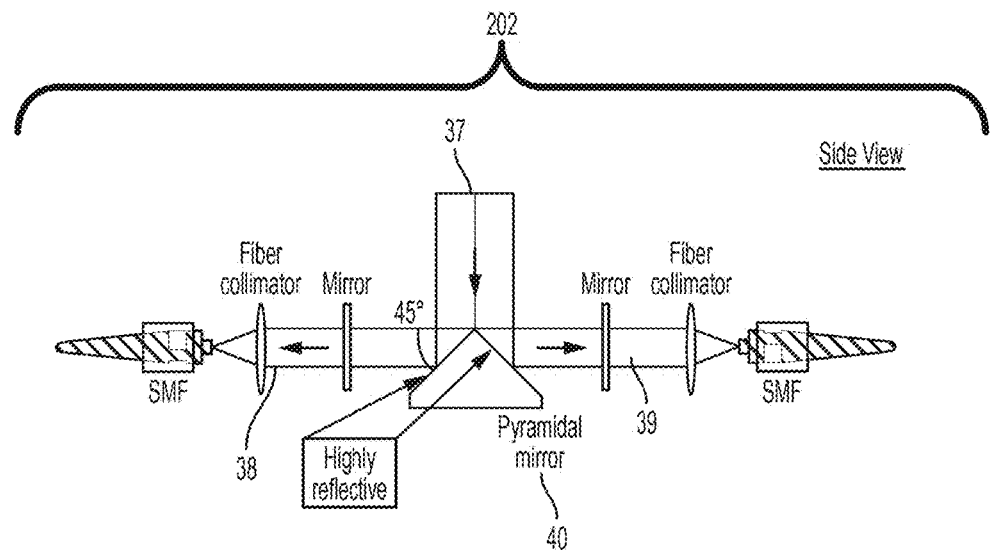
FIG. 7C shows a side view of a fiber collimator (FC) implementation.
Figure 7D:
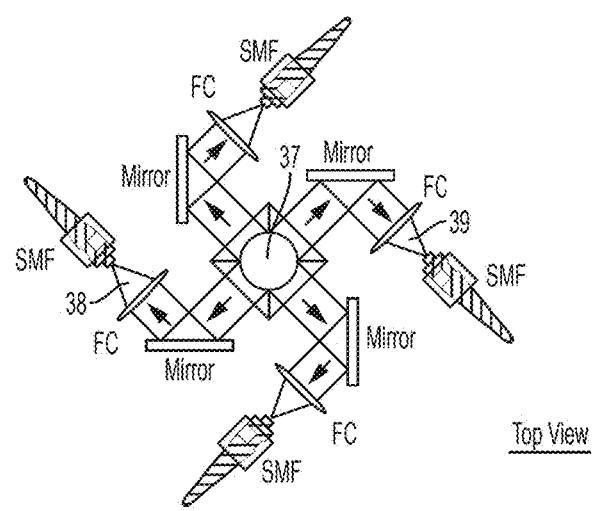
FIG. 7D shows a top view of an FC implementation.
Figures 8A, 8B, 8C, 8D, 8E:
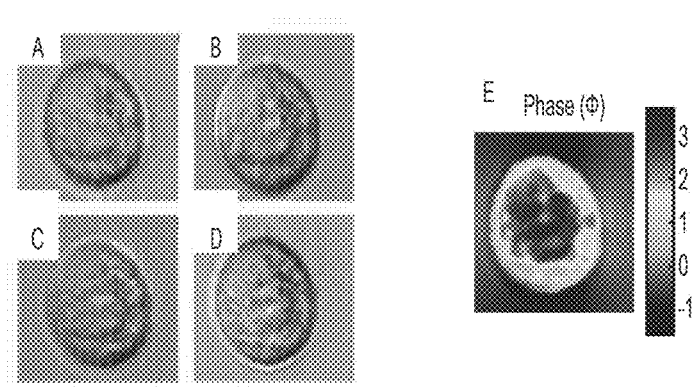
FIG. 8A shows an image of a human chondrocyte flowing at 2 m/s.
FIG. 8B shows an image of a human chondrocyte flowing at 2 m/s.
FIG. 8C shows an image of a human chondrocyte flowing at 2 m/s.
FIG. 8D shows an image of a human chondrocyte flowing at 2 m/s.
FIG. 8E shows a retrieved quantitative phase image of a human chondrocyte captured by a method of the subject invention.

Referring to the multiple-angle wavefront detection module 4 or 14, FIGS. 7A through 7D show two different compact implementation approaches for multiple wavefront tilt detection (N=4) according to certain embodiments of the subject invention, Referring to FIGS. 7A and 7B, an approach 201 based on the two pyramidal prisms is illustrated. The pyramidal prisms 32 and 33 are employed to spatially separate the spectrally-encoded (image-encoded) beam 34 into N=4 partitions, each of which corresponds to the four different gradient-phase contrasts to be multiplexed and detected in the subject invention. FIG. 7B shows, from the top view, the coupling scheme of two of the split beams 35 and 36 into the optical fibers through the fiber collimators. Referring to FIGS. 7C and 7D, an approach 202 for multiple wavefront tilt detection (N=4) based on the pyramidal mirror 40 is illustrated. The pyramidal mirror 40 is employed to spatially separate the spectrally-encoded (image-encoded) beam 37 (from the top) into N=4 partitions, each of which corresponds to the four different gradient-phase contrasts to be multiplexed and detected in the subject invention. FIG. 7C shows, from the side view, the coupling scheme of two of the split beams 38 and 39 into the optical fibers through the fiber collimators. These are two practical and compact approaches for multiple wavefront tilt detection (by the use of pyramidal prism, pyramidal mirror and multiple optical fibers), and these unique implementations cannot be employed in any existing phase-contrast-based microscope systems.

Embodiments of the subject invention can be employed as ultrafast imaging flow cytometers for high-throughput single-cell analysis in fluid flow or suspension (e.g., rare cancer cell detection, enabling platform for single-cell transcriptome). Embodiments can also be employed for large-scale imaging of the adherent biospecimen (e.g., biochemically-captured cells on a solid substrate or fixed tissue sections). Applications for these specimens include whole-slide imaging (WSI) and tissue microarray (TMA), both of which involve high-throughput histological examination for the emerging field of digital pathology. Other applications can also involve quantitative imaging inspection for high-volume manufacturing process (e.g., VLSI semiconductor chip inspection).

While existing imaging flow cytometers capture images based on conventional image sensor technologies (i.e., CCD/CMOS image sensors), the image acquisition rate is largely impeded by the fundamental speed-sensitivity trade-off in these CCD/CMOS sensors. As a result, the imaging throughput is limited to <1000 cells/second, which is orders of magnitude slower than the quantitative phase imaging throughput achieved by embodiments of the subject invention (e.g., 100,000 cells/second or more). Also, unlike the subject invention, existing flow cytometers are unable to retrieve quantitative phase imaging information, which serves as the intrinsic biomarkers of the individual cells for high-throughput single-cell analysis.

Existing QPI devices also capture images based on conventional image sensor technologies (i.e., CCD/CMOS image sensors); hence, the image acquisition rate is again largely impeded by the fundamental speed-sensitivity trade-off in these CCD/CMOS sensors. In contrast, in many embodiments of the subject invention, quantitative phase information is acquired by a chirped-wavelength encoded mechanism, which facilitates high-speed image detection in a flexible optical fiber format.

Systems and methods of the subject invention also have advantages over time-stretch imaging platforms. None of the existing time-stretch imaging platforms are able to deliver quantitative gradient phase information, which enables phase retrieval without the need for interferometry.

The methods and processes described herein can be embodied as code and/or data. The software code and data described herein can be stored on one or more computer-readable media, which may include any device or medium that can store code and/or data for use by a computer system. When a computer system reads and executes the code and/or data stored on a computer-readable medium, the computer system performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that is capable of storing computer-readable information/data. Computer-readable media should not be construed or interpreted to include any propagating signals.

Embodiments of the subject invention can perform imaging on a sample that is biological cells in fluidic flow suspension, microparticles in fluidic flow suspension, and/or biological cells and tissue sections fixed on a solid substrate (e.g., a mechanically actuated platform such as a platform producing spinning motion or a platform producing unidirectional linear motion). The method can include scanning the sample using the imaging apparatus or a part thereof.

Following are examples that illustrate procedures for practicing the invention. These examples should not be construed as limiting.

Example 1

Quantitative phase retrieval was performed using a system as described herein. For N=4, the local wavefront tilt in the x- and y-directions, $\theta_x(x,y)$ and $\theta_y(x,y)$, introduced by the sample can be quantified by the simple algebraic relations in the paraxial approximation: $\theta_x(x,y)=C(I_1+I_2-I_3-I_4)/I_{total}$, $\theta_y(x,y)=C(I_1-I_2-I_3+I_4)/I_{total}$, where $I_k$ are the four raw images captured at different coupling angles (k=1, 2, 3, 4). $I_{total}$ is the total intensity of four raw images at (x,y). C is a constant which can be evaluated through system calibration. The phase $\varphi(x,y)$ is obtained by the relation:

$$\vec{\nabla}_{\varphi(x,y)} = \frac{2\pi \vec{\theta}(x, y)}{\lambda},$$

which can be robustly solved by the Fourier integration method (see also, e.g., FIG. 2B). $\lambda$ is the mean wavelength. This method eliminates the need for iterative phase retrieval algorithms, as in interferometry-based quantitative phase imaging, and thus greatly reduces the computational complexity; this is critical for real-time data processing at the uniquely high imaging speed. Related art approaches for quantitative phase-gradient microscopy have low imaging speed (~kHz) that is limited by the typical image sensors.

Figures 6A, 6B:
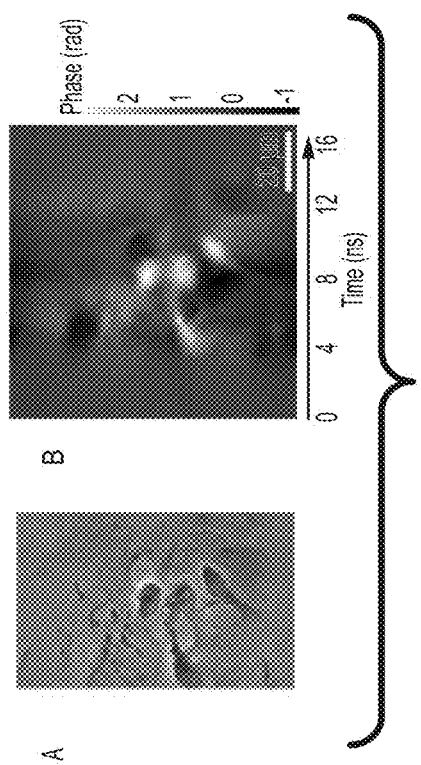
FIG. 6A shows an image of nasopharyngeal epithelial cells captured by phase contrast microscopy.
FIG. 6B shows a retrieved quantitative phase image captured by a method of the subject invention.

FIGS. 5A-5D, 6A-6B, 8A-8E, and 9A-9B illustrate the experimental results of an exemplary apparatus provided by the subject invention. FIGS. 5A-5D show four images (with different gradient phase contrasts) of nasopharyngeal epithelial cells captured with four different fiber-coupling angles (see FIGS. 2A-2D) at a line-scan rate of 26 MHz. One single-shot line-scan was captured within about 10 nanoseconds (ns), giving a duty cycle of about 25%. These images were then used to compute the quantitative phase of the cells, shown in FIG. 6B. FIG. 6A shows nasopharyngeal epithelial cells captured by phase contrast microscopy, and FIG. 6B shows a retrieved quantitative phase image in the same region captured by the technique provided in the subject invention, with line-scan rate of 26 MHz.

Figures 9A, 9B:
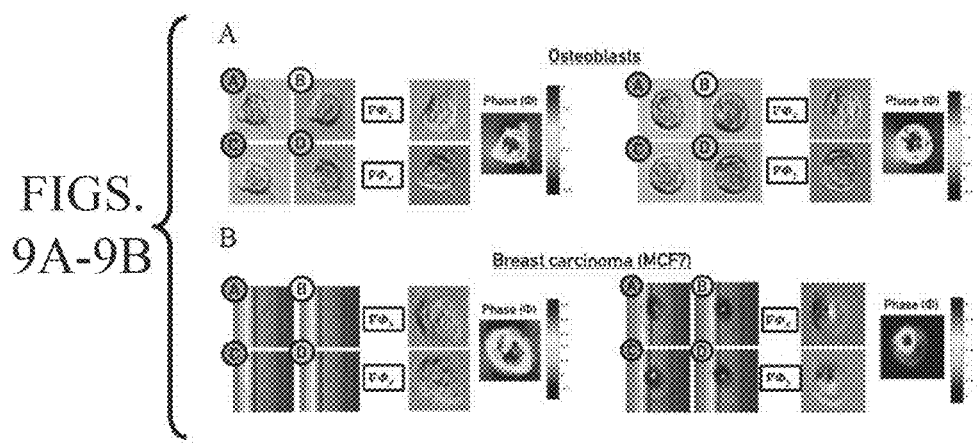
FIG. 9A shows images of two human osteoblasts flowing at 2 m/s.
FIG. 9B shows images of two human breast carcinoma flowing at 2 m/s.

FIGS. 8A-8D show images of a human chondrocyte flowing at about 3 meters per second captured with four different fiber-coupling angles (see FIGS. 2A-2D) at a line-scan rate of 11.6 MHz. Again, one single-shot line-scan was captured within 6 ns, giving a duty cycle less than 25%. FIG. 8E shows a reconstructed quantitative phase image of the same human chondrocyte captured by the technique of the subject invention, with line scan rate of 11.6 MHz. FIGS. 9A and 9B show images of two human osteoblasts (FIG. 9A) and two breast carcinoma (FIG. 9B) flowing at about 3 meters per second captured with four different fiber-coupling angles at a line-scan rate of 11.6 MHz. The reconstructed quantitative phase images of the two cells are also shown to provide correlation of the internal cellular contents, the high phase values of which are believed to the nuclei or vesicles of the cells.

Referring to FIGS. 5A-5D, four high-contrast images of the nasopharyngeal epithelial cells are shown in the same field-of-view, but captured with four different fiber coupling angles. All these images resemble the image quality taken by classical DIC microscopy, but they are captured with a single-shot line scan rate is as high as 26 MHz. Based on these four images, two different contrasts can further be obtained from the same sample: one with differential (enhanced) phase-gradient contrast (subtraction of the two signals) and another with absorption contrast (addition of the two signals), simultaneously. This method decouples the phase-gradient information from absorption, resulting in further enhancement of the image contrast. In addition, it helps to extract the local wavefront tilt from which the quantitative phase can be evaluated by the aforementioned algorithm (see also, e.g., FIGS. 6A and 6B).

Referring to FIG. 6B, compared to the image taken by a phase contrast microscope (FIG. 6A), the quantitative phase image taken by the subject technique not only reveals the cellular features consistent with the phase-contrast image, it also provides the quantitative phase information, which is absent in conventional phase contrast or DIC images. The quantitative phase imaging speed of this technique (26 MHz) is orders of magnitude faster than any existing QPM modalities.

Referring to FIGS. 8A-8D, four high-contrast images captured with four different fiber coupling angles of the same chondrocyte flowing at 3 m/s in a microfluidic channel are shown. Similar to FIGS. 5A-5D, all of these images show an image quality of classical DIC microscopy, but they are obtained with a single-shot line scan rate as high as 26 MHz. FIG. 8E shows the reconstructed quantitative phase image of the same chondrocyte by the aforementioned algorithm, of whose internal details are clearly revealed.

FIGS. 9A-9B show four high-contrast fiber-coupled and reconstructed quantitative phase images of osteoblasts and breast carcinoma (MCF-7) captured with a line-scan rate of 11.6 MHz. Each of them shows 3D appearance of internal structures similar to DIC microscopy. The contrast enhancement helps determination of cellular contents, e.g. FIG. 9B shows nucleus of a breast carcinoma.

Example 2

In addition to the retrieval of quantitative phase images of each single cells, quantitative cellular parameters and thus cell analysis can be obtained from the quantitative phase and absorption images. With the use of the subject inventions or other QPI techniques, these parameters can be obtained non-invasively by derivations from the optical phase. Optical phase is directly related to the optical path length of the light transmitted through the cells, which is the product of the height of the cells and the refractive index difference to the neighboring substances. Common quantitative phase parameters include dry mass, dry mass density, phase volume and sphericity, which have been shown to provide significant values in cell classifications, tumor characterization and studies throughout cell cycle. These parameters can be derived from the following equations:

$$\text{Dry mass: } M = \frac{1}{\alpha} \int_{S_{cell}} OPL_{cell}(x, y)dS = \frac{S_{cell}}{\alpha} \times \overline{OPL_{cell}}$$

$$\text{Dry mass surface density: } \overline{M} = M / S_{cell}$$

$$\text{Phase volume: } V_\phi = \int_{S_{cell}} OPL_{cell}(x, y)dS$$

$$\text{Sphericity: } \Psi = \pi^{\frac{1}{3}} \times \frac{(6 \cdot OPL_{cell})^{\frac{2}{3}}}{SA_\phi}$$

where α is the refractive increment of the cells, which is about 0.18-0.21 ml/g for a normal cell, $S_{cell}$ is the projected cell area, $OPL_{cell}$ is the optical path length difference over the cell area, is the averaged OPL, $SA_\varphi$ is the phase surface area of the cell.

Figure 10:
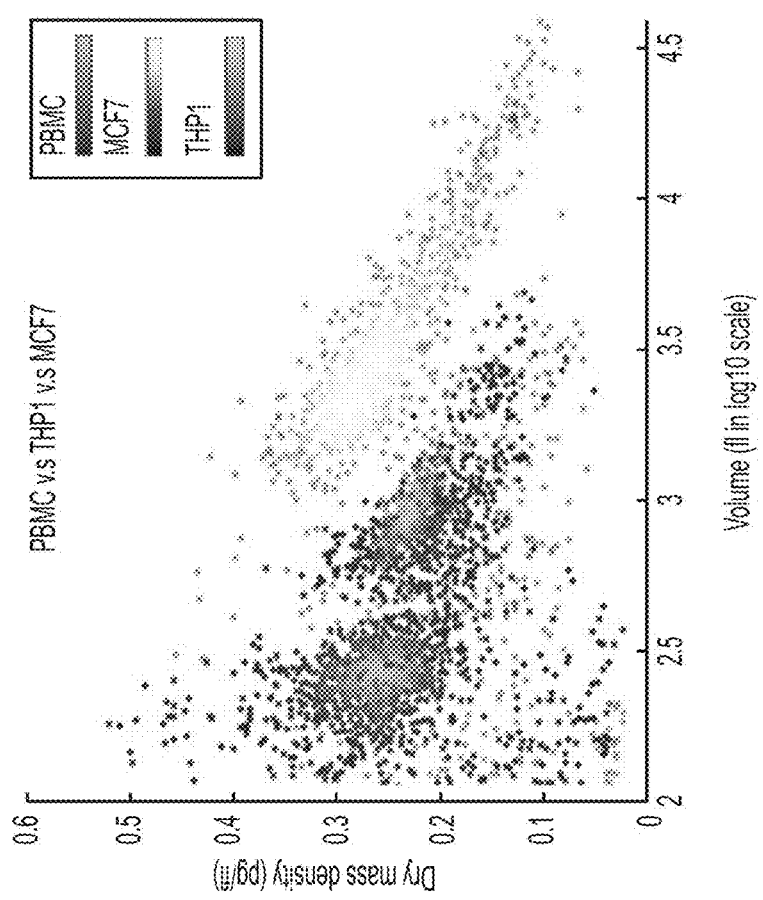
FIG. 10 shows a heat map of PBMC, THP-1 and MCF7.
Figure 11C:
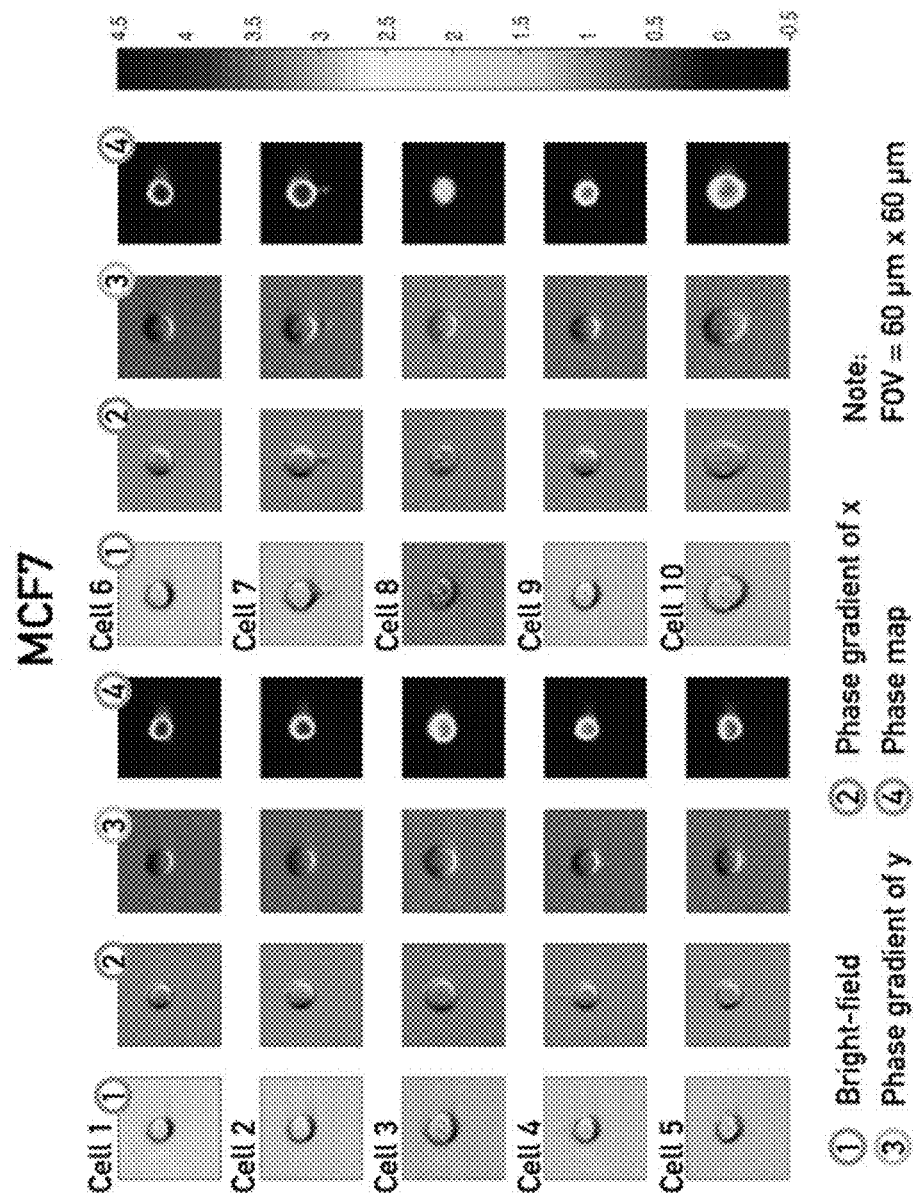
FIG. 11C shows images of four image contrasts of ten MCF7.

FIGS. 10, 11A-11C, and 12A-12C illustrate the example plots for classification of cells and single-cell analysis for both clinical applications and basic science research based on the subject invention. FIG. 10 depicts the heat map of dry mass density contrast convergence against average dry mass density contrast of human peripheral blood mono-nuclear cells (PBMCs), human leukemic monocytes (THP1) and breast carcinoma (MCF-7) flowing at a speed of ~1 m/s respectively. Each of the clusters can be easily identified and occupy its own regions in the plot. For the three cell types, all of them show similar dry mass density, which is of the same range of values in previous studies—indicating the phase values and thus quantitative cellular parameters obtained are of true reflection of their actual values. Comparing PBMCs and THP1, the location of the cluster of THP1 shows a larger size compared to normal white blood cells due to the increase of nuclear size. This finding is of significant value, especially for providing cost effective way to identify normal and cancerous blood cells. Conventional techniques used to differentiate THP1 from normal blood cells include the use of about 26 staining reagents, which is generally unfavorable in clinical practice. Comparing PBMCs and MCF7, MCF7 can be easily separated from PBMCs primarily based on the volume differences. This comparison provides a proof that obtaining quantitative phase images of single cells can deliver an easier, simpler and more cost effective method for cancer cell screening. The corresponding cell images of the three cell types captured with a line scan rate of 11.6 MHz are depicted in FIGS. 11A-11C. It is worthwhile to note that these four different image contrasts (1. absorption contrast, 2. phase gradient contrast of x-direction, 3. phase gradient contrast of y-direction and 4. quantitative phase contrast) of a cell are all obtained simultaneously, simply by post-processing the four high-contrast images obtained with four coupling angles (see FIGS. 5A-5D).

Figure 12A:
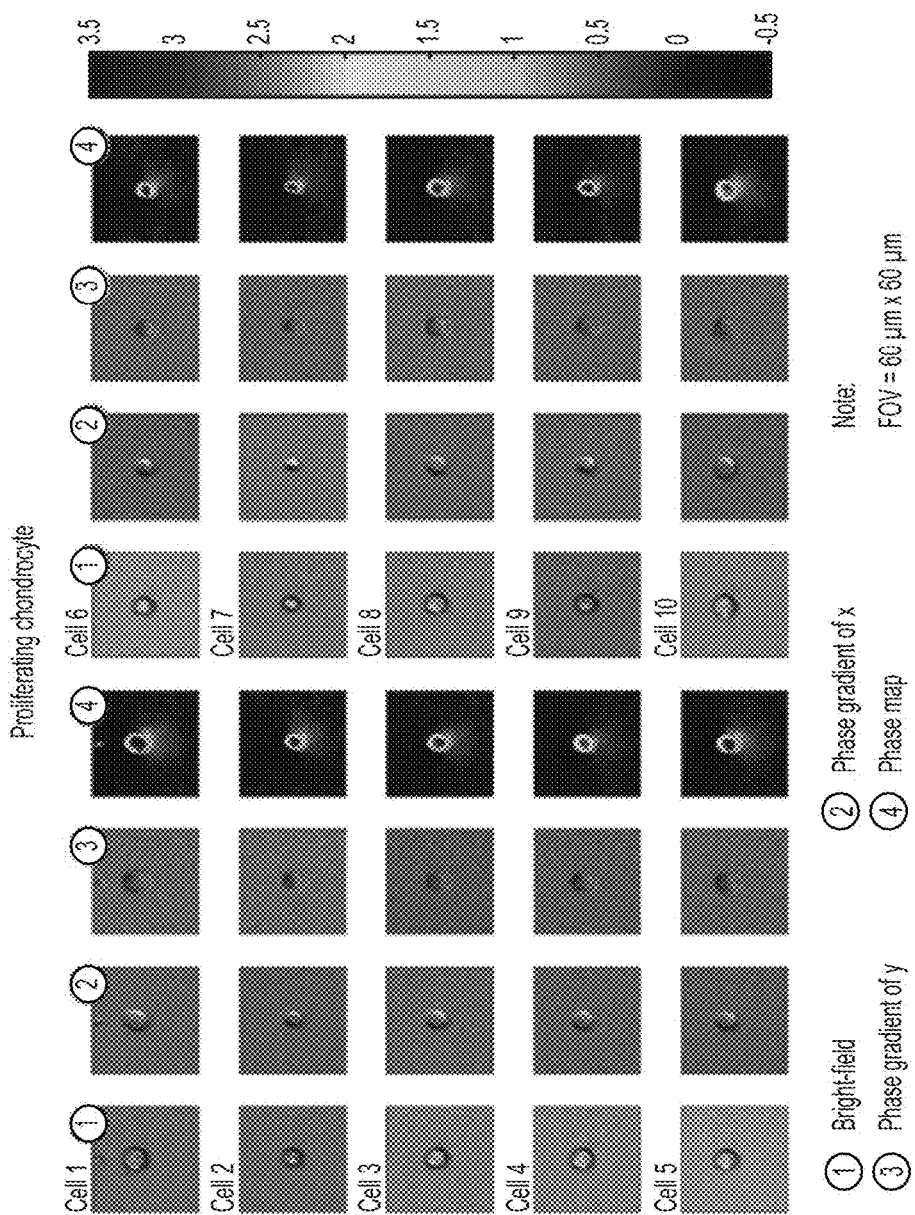
FIG. 12A shows images of four image contrasts of ten proliferating chondrocytes.
Figure 12B:
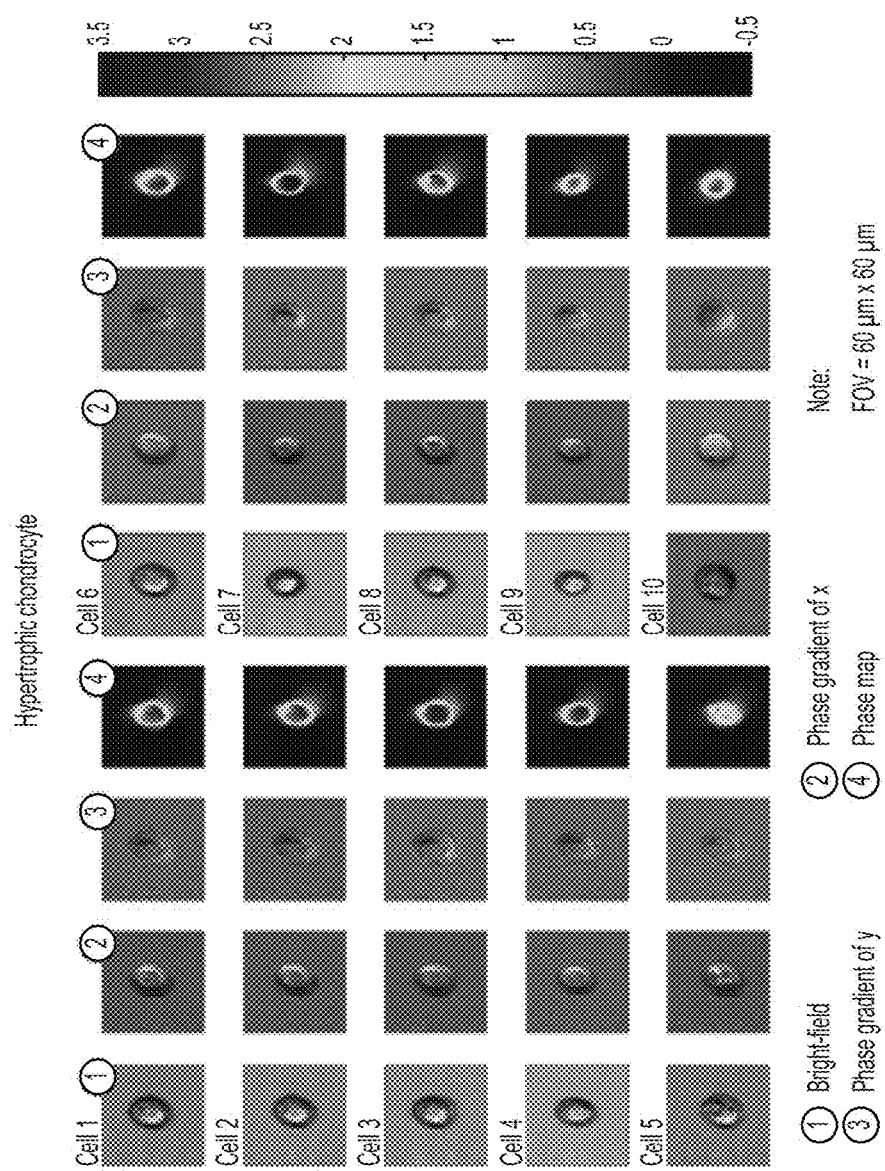
FIG. 12B shows images of four image contrasts of ten hypertrophic chondrocytes.
Figure 12C:
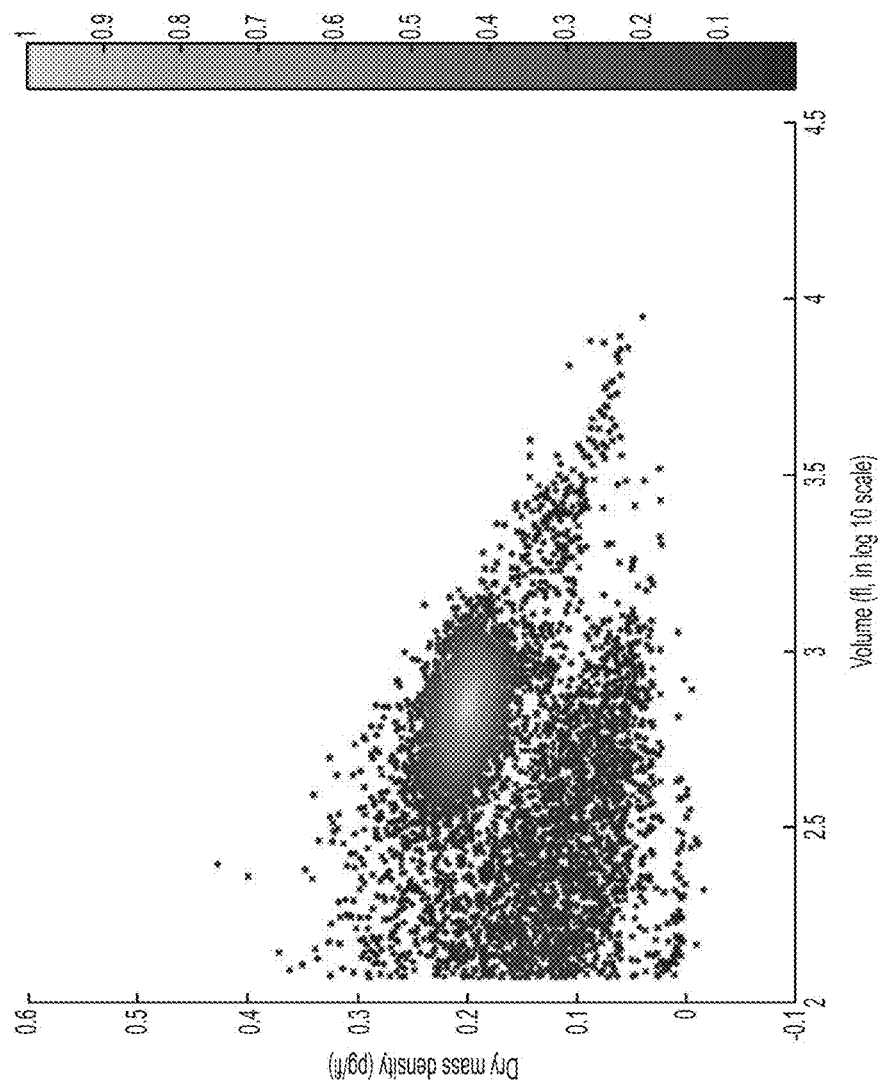
FIG. 12C shows a heat map of combined proliferating chondrocytes and hypertrophic chondrocytes.

Referring to FIGS. 12A-12B, cell images of 10 proliferating chondrocytes and 10 hypertrophic chondrocytes are shown. Similar to FIGS. 11A-11C, the cell images were captured with a flow speed of ~1 m/s and 11.6 MHz line-scan rate. The four different image contrasts of each cell are shown and obtained simultaneously to help visualize details of each cell. FIG. 12C shows the heat map of the transition from proliferating chondrocytes to hypertrophic chondrocytes. A major trend of transition from proliferating chondrocytes to hypertrophic chondrocytes can be observed, indicating this transition involves cell enlargement in size with a decrease in dry mass density. Apart from this transition trend, the dots in the cluster on bottom left corner refer to debris and fragments of cells, which are of irregular shape and with a highly varying dry mass density. This cluster of cells can be easily identified and gated to improve purity of cell digitally.

It should be understood that the examples and embodiments described herein are for illustrative purposes only and that various modifications or changes in light thereof will be suggested to persons skilled in the art and are to be included within the spirit and purview of this application and the scope of the appended claims. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

All patents, patent applications, provisional applications, and publications referred to or cited herein (including those in the "References" section) are incorporated by reference in their entirety, including all figures and tables, to the extent they are not inconsistent with the explicit teachings of this specification.

REFERENCES

Relating to Flow Cytometry:
Blood and cell analysis using an imaging flow cytometer, U.S. Pat. No. 7,925,069 B2
Oil-immersion enhanced imaging flow cytometer, U.S. Pat. No. 7,796,256 B2
Detection of circulating tumor cells using imaging flow cytometry, U.S. Pat. No. 8,548,219 B2
Imaging flow cytometer, EP 0543514 A2
Imaging flow cytometer for imaging and analyzing particle components in a liquid sample, U.S. Pat. No. 5,444,527 A
Imaging flow cytometer and imaging method having plural optical paths of different magnification power, U.S. Pat. No. 5,521,699 A
D. A. Basiji, W. E. Ortyn, L. Liang, V. Venkatachalam, & P. Morrissey, "Cellular Image Analysis and Imaging by Flow Cytometry," Clin Lab Med. 27, 653-670 (2007).
Sai Siva Gorthi and Ethan Schonbrun, "Phase imaging flow cytometry using a focus-stack collecting microscope," Opt. Lett. 37, 707-709 (2012).
George, T. C., Basiji, D. A., Hall, B. E., Lynch, D. H., Ortyn, W. E., Perry, D. J., Seo, M. J., Zimmerman, C. A. and Morrissey, P. J. (2004), Distinguishing modes of cell death using the ImageStream® multispectral imaging flow cytometer. Cytometry, 59A: 237-245.
Ata Mahjoubfar, Claire Chen, Kayvan R. Niazi, Shahrooz Rabizadeh, and Bahram Jalali, "Label-free high-throughput cell screening in flow," Biomed. Opt. Express 4, 1618-1625 (2013).
Schonbrun, E., Malka, R., Di Caprio, G., Schaak, D. and Higgins, J. M. (2014), Quantitative absorption cytometry for measuring red blood cell hemoglobin mass and volume. Cytometry, 85: 332-338.
Relating to Quantitative Phase Contrast Imaging:
Quantitative phase microscopy for label-free high-contrast cell imaging, U.S. Pat. No. 8,693,000 B2
Quantitative phase-imaging systems, U.S. Pat. No. 8,248,614 B2
Systems and methods self-referenced quantitative phase microscopy, WO 2013086527 A1
System and method for Hilbert phase imaging, US 20060291712 A1
Method for simultaneous amplitude and quantitative phase contrast imaging by numerical reconstruction of digital holograms, U.S. Pat. No. 6,262,818 B1
Spatial-domain low-coherence quantitative phase microscopy, US 20130229663 A1
Quantitative phase-contrast digital holography method for the numerical reconstruction of images, and relevant apparatus, US 20080309944 A1
Quantitative differential interference contrast (DIC) microscopy and photography based on wavefront sensors, U.S. Pat. No. 8,039,776 B2
Spatial light interference microscopy and fourier transform light scattering for cell and tissue characterization, U.S. Pat. No. 8,184,298 B2

G. Popescu, T. Ikeda, K. Goda, C. A. Best-Popescu, M. Laposata, S. Manley, R. R. Dasari, K. Badizadegan, and M. S. Feld, "Optical measurement of cell membrane tension," Phys. Rev. Lett. 97, 218101 (2006).

G. Popescu, K. Badizadegan, R. R. Dasari, and M. S. Feld, "Observation of dynamic subdomains in red blood cells," J. Biomed. Opt. 11, 040503 (2006).

W. Choi, C. F. Yen, K. Badizadegan, S. Oh, N. Lue, R. R. Dasari and M. S Feld, "Tomographic phase microscopy," Nat. Methods 4, 717 (2007).

L. Yu, S. Mohanty, G. Liu, S. Genc, Z. Chen, M. W. Berns, "Quantitative phase evaluation of dynamic changes on cell membrane during laser microsurgery," J. Biomed. Opt. 13, 050508 (2008).

C. Joo, T. Akkin, B. Cense, B. H. Park, and J. F. de Boer, "Spectral-domain optical coherence phase microscopy for quantitative phase-contrast imaging," Opt. Lett. 30, 2131 (2005).

T. Yamauchi, H. Iwai, M. Miwa, and Y. Yamashita, "Low-coherent quantitative phase microscope for nanometer-scale measurement of living cells morphology," Opt. Express 16, 12227 (2008).

P. Wang, R. Bista, R. Bhargava, R. E. Brand, and Y. Liu, "Spatial-domain low-coherence quantitative phase microscopy for cancer diagnosis," Opt. Lett. 35, 2840 (2010).

T. Ikeda, G. Popescu, R. R. Dasari, and M. I S. Feld, "Hilbert phase microscopy for investigating fast dynamics in transparent systems," Opt. Lett. 30, 1165 (2005).

Y. Park, T. Yamauchi, W. Choi, R. Dasari, and M. S. Feld, "Spectroscopic phase microscopy for quantifying hemoglobin concentrations in intact red blood cells," Opt. Lett. 34, 3668 (2009).

E. Cuche, F. Bevilacqua, and C. Depeursinge, "Digital holography for quantitative phase contrast imaging," Opt. Lett. 24, 291-293 (1999).

Florian Charriére, Anca Marian, Frédéric Montfort, Jonas Kuehn, Tristan Colomb, Etienne Cuche, Pierre Marquet, and Christian Depeursinge, "Cell refractive index tomography by digital holographic microscopy," Opt. Lett. 31, 178 (2006).

Natan T. Shaked, Lisa L. Satterwhite, Nenad Bursac, and Adam Wax, "Whole-cell-analysis of live cardiomyocytes using wide-field interferometric phase microscopy," Biomed. Opt. Express 1, 706-719 (2010).

Pinhas Girshovitz and Natan T. Shaked, "Generalized cell morphological parameters based on interferometric phase microscopy and their application to cell life cycle characterization," Biomed. Opt. Express 3, 1757-1773 (2012).

P. Marquet, C. Depeursinge, and P. J. Magistretti, "Exploring Neural Cell Dynamics with Digital Holographic Microscopy," Annual Review of Biomedical Engineering, 15, 407 (2013).

Relating to Time-Stretch Imaging:

K. Goda, K. K. Tsia, and B. Jalali, "Amplified dispersive Fourier-transform imaging for ultrafast displacement sensing and barcode reading," Appl. Phys. Lett. 93, 131109 (2008).

K. Goda, K. K. Tsia, and B. Jalali, "Serial time-encoded amplified imaging for real-time observation of fast dynamic phenomena," Nature 458, 1145 (2009).

K. K. Tsia, K. Goda, D. Capewell, and B. Jalali, "Performance of serial time-encoded amplified microscope," Opt. Express 18, 10016 (2010).

B. Jalali, K. Goda, P. Soon-Shiong, and K. Tsia, "Time-stretch imaging and its applications to high-throughput microscopy and microsurgery," IEEE Photonics Society Newsletter, 24, 11 (2010).

C. Zhang, Y. Qiu, R. Zhu, K. K. Y. Wong, and K. K. Tsia, "Serial time-encoded amplified microscopy (STEAM) based on a stabilized picosecond supercontinuum source," Opt. Express 19, 15810 (2011).

Y. Qiu, J. Xu, K. K. Y. Wong, and K. K. Tsia, "Exploiting few mode-fibers for optical time-stretch confocal microscopy in the short near-infrared window," Opt. Express 20, 24115-24123 (2012)

T. T. W. Wong, A. K. S. Lau, K. K. Y. Wong, K. K. Tsia, "Optical time-stretch confocal microscopy at 1 um," Opt. Lett. 37, 3330 (2012).

K. Goda, A. Ayazi, D. R. Gossett, J. Sadasivam, C. K. Lonappan, E. Sollier, A. M. Fard, S. C. Hur, J. Adam, C. Murray, C. Wang, N. Brackbill, D. D. Carlo and B. Jalali, "High-throughput single-microparticle imaging flow analyzer," Proc. Natl. Acad. Sci. 109, 11630-11635 (2012).

Ata Mahjoubfar, Claire Chen, Kayvan R. Niazi, Shahrooz Rabizadeh, and Bahram Jalali, "Label-free high-throughput cell screening in flow," Biomed. Opt. Express 4, 1618-1625 (2013).

T. T. W. Wong, A. K. S. Lau, K. K. Y. Ho, M. Y. H. Tang, J. D. F. Robles, X. Wei, A. C. S. Chan, A. H. L. Tang, E. Y. Lam, K. K. Y. Wong, G. C. F. Chan, H. C. Shum, and K. K. Tsia, "Asymmetric-detection time-stretch optical microscopy (ATOM) for ultrafast high-contrast cellular imaging in flow," Sci. Rep. 4, 3656 (2014).

Differential interference contrast serial time encoded amplified microscopy, US 20130135529 A1

Apparatus and method for dispersive Fourier-transform imaging, U.S. Pat. No. 8,376,218 B2

Apparatus and method for optically amplified imaging, US 20100141829 A1

What is claimed is:

1. An apparatus for optically imaging a sample, comprising:
   a light source;
   means for obtaining gradient phase contrast information about the sample using the light source;
   means for spectrally encoding the gradient phase contrast information;
   means for performing passive gradient phase-encoded signal multiplexing;
   a memory for storing multiplexed signals; and
   means for performing digital signal de-multiplexing and quantitative phase image reconstruction, thereby improving the speed and contrast with which the apparatus optically images the sample.

2. The apparatus according to claim 1, wherein the sample comprises biological cells in fluidic flow suspension, microparticles in fluidic flow suspension, or biological cells and tissue sections fixed on a solid substrate scanned by the apparatus.

3. The apparatus according to claim 2, wherein the solid substrate is a mechanically actuated platform scanned in a unidirectional linear motion or a spinning motion.

4. The apparatus according to claim 1, wherein the light source is a broadband pulsed laser.

5. The apparatus according to claim 1, wherein the light source is a broadband wavelength-swept laser.

6. The apparatus according to claim 5, wherein the broadband wavelength-swept laser is of a mechanical wavelength-swept source or non-mechanical wavelength-swept source, the broadband wavelength-swept laser comprising: a broadband pulsed laser; a dispersive element for chirping, sweeping the wavelength of the pulse in time, or both; and an optical amplifier module.

7. The apparatus according to claim 1, wherein the means for spectrally encoding the gradient phase contrast information comprises a spatial disperser capable of spatially dispersing the wavelength spectrum of the light source in one-dimensional or two-dimensional space, the spatial disperser comprising: a diffraction grating or prism for the one-dimensional spatial disperser; or a combination of diffraction grating or prism and a virtually-imaged phase array for the two-dimensional spatial disperser.

8. The apparatus according to claim 1, further comprising means for performing multiple wavefront tilt detection implemented by the phase-gradient image information spectrally-encoded in an optical beam.

9. The apparatus according to claim 8, comprising:
splitting the spectrally-encoded optical beam into N spatially separated light beams;
generating N different wavefront tilts in space in N spatially separated light beams; and
multiplexing N wavefront-tilted, spectrally-encoded light signals.

10. The apparatus according to claim 9, wherein splitting the spectrally-encoded optical beam into N spatially separated light beams is implemented by the use of beam splitters, pyramidal prisms, or pyramidal mirrors.

11. The apparatus according to claim 9, wherein generating N different wavefront tilts in space in N spatially separated light beams comprises angle-misaligned coupling from N different orientations into optical fibers; any spatial partitioning of the spectrally-encoded beam; or beam partitioning by pyramidal prisms or pyramidal mirrors.

12. The apparatus according to claim 1, wherein the means for performing passive phase-gradient-encoded signal multiplexing is implemented by at least one of a time-division multiplexing (TDM) scheme, a frequency-division multiplexing (FDM) scheme, and a code-division multiplexing (CDM) scheme.

13. The apparatus according to claim 12, wherein the TDM is implemented by optical delay-lines capable of separating the N wavefront-tilted, spectrally-encoded light signals in time, the optical delay-lines comprising free-space delay-lines and optical fiber delay-lines.

14. The apparatus according to claim 12, wherein the FDM scheme, the CDM scheme, or both are implemented through passive amplitude modulation, wherein the passive amplitude modulation bypasses the use of active acousto-optic and/or electro-optic modulators and is implemented by a spatial disperser and a static spatial mask.

15. The apparatus according to claim 14, wherein the static spatial mask comprises a printed or a pre-fabricated pattern capable of performing spectral amplitude modulation on the spatially dispersed light beams transmitted through the mask or reflected from the mask.

16. The apparatus according to claim 1, wherein the quantitative phase image is manipulated within a single optical beam without the need for utilizing interferometric approaches.

17. The apparatus according to claim 1, wherein the quantitative phase image is further processed to extract one or more morphological and texture parameters selected from total size, total volume, total dry mass, and dry mass density map.

18. A method of optically imaging a sample using an apparatus, the method comprising:
obtaining gradient phase contrast information about the sample using a light source of the apparatus;
spectrally encoding the gradient phase contrast information;
performing passive gradient phase-encoded signal multiplexing;
storing multiplexed signals on a memory of the apparatus; and
performing digital signal de-multiplexing and quantitative phase image reconstruction,
wherein the quantitative phase image is manipulated within a single optical beam without the need for utilizing interferometric approaches, thereby improving the speed and contrast with which the apparatus optically images the sample.

19. The method according to claim 18, wherein the light source is a broadband wavelength-swept laser of a mechanical wavelength-swept source or a non-mechanical wavelength-swept source, the broadband wavelength-swept laser comprising: a broadband pulsed laser; a dispersive element for chirping, sweeping the wavelength of the pulse in time, or both; and an optical amplifier module.

20. The method according to claim 18, further comprising performing multiple wavefront tilt detection implemented by the phase-gradient image information spectrally-encoded in an optical beam, the multiple wavefront tilt detection comprising:
splitting the spectrally-encoded optical beam into N spatially separated light beams;
generating N different wavefront tilts in space in N spatially separated light beams; and
multiplexing N wavefront-tilted, spectrally-encoded light signals.

* * * * *